United States Patent
Khullar

(12) 
(10) Patent No.: US 6,748,246 B1
(45) Date of Patent: Jun. 8, 2004

(54) METHOD AND APPARATUS FOR SELECTING AN ACCESS TECHNOLOGY IN A MULTI-MODE TERMINAL

(75) Inventor: Anders Khullar, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 507 days.

(21) Appl. No.: 09/677,130

(22) Filed: Sep. 29, 2000

Related U.S. Application Data

(60) Provisional application No. 60/216,042, filed on Jul. 5, 2000.

(51) Int. Cl.$^7$ .............................. H04B 1/38; H04M 1/00
(52) U.S. Cl. .................... 455/574; 455/465; 455/552.1; 455/525; 455/553.1; 455/67.11
(58) Field of Search ................................ 455/426, 552, 455/553, 524, 525, 465, 554, 555, 67.11, 574, 552.1, 554.1, 553.1, 426.1, 554.2

(56) References Cited

U.S. PATENT DOCUMENTS

| | | | |
|---|---|---|---|
| 5,392,462 A | | 2/1995 | Komaki |
| 5,497,507 A | | 3/1996 | Komaki |
| 5,845,215 A | | 12/1998 | Henry et al. |
| 5,978,686 A | | 11/1999 | Aoshima |
| 5,999,829 A | | 12/1999 | Chun et al. |
| 6,035,212 A | | 3/2000 | Rostoker et al. |
| 6,070,087 A | | 5/2000 | Aoshima |
| 6,119,003 A | * | 9/2000 | Kukkohovi ............ 455/435.2 |
| 6,134,453 A | * | 10/2000 | Sainton et al. ............ 455/553.1 |
| 6,185,435 B1 | * | 2/2001 | Imura ...................... 455/552.1 |
| 6,263,200 B1 | * | 7/2001 | Fujimoto ................ 455/343.5 |
| 6,298,222 B1 | * | 10/2001 | Bergveld et al. ......... 455/127.5 |
| 6,400,946 B1 | * | 6/2002 | Vazvan et al. ........... 455/432.1 |
| 6,459,896 B1 | * | 10/2002 | Liebenow ................... 455/425 |

FOREIGN PATENT DOCUMENTS

| | | |
|---|---|---|
| EP | 660626 A2 * | 6/1995 |
| EP | 0 896 493 | 2/1999 |
| EP | 0896493 A2 | 2/1999 |
| JP | 06069853 A * | 3/1994 |
| WO | 98/57467 | 12/1998 |
| WO | 98/58512 | 12/1998 |

* cited by examiner

*Primary Examiner*—Nick Corsco
*Assistant Examiner*—Sujatha Sharma
(74) *Attorney, Agent, or Firm*—Burns, Doane, Swecker & Mathis, L.L.P.

(57) ABSTRACT

Method and apparatus for selecting an access technology in a multi-mode terminal are provided. Information is exchanged between a multi-mode terminal and at least one base station using a first access technology, the multi-mode terminal being capable of exchanging information with the at least one base station using a number of access technologies. The type of information exchanged is identified, and at least a second access technology is determined, different from the first access technology, that is capable of exchanging information of the identified information type. The first and at least second access technologies form a set of compatible access technologies. A determination is made as to the minimum radiated power level needed to exchange the information with the at least one base station for each of the compatible access technologies. An optimal access technology requiring a lowest amount of battery energy among the set of compatible access technologies is selected to maintain the minimum radiated power level needed to exchange the information between the multi-mode terminal and the at least one base station.

19 Claims, 3 Drawing Sheets

METHOD AND APPARATUS FOR SELECTING AN ACCESS TECHNOLOGY IN A MULTI-MODE TERMINAL

RELATED APPLICATIONS

This application is related to, and claims priority from, U.S. Provisional Application Serial No. 60/216,042 entitled "System Assignment Procedure" filed on Jul. 5, 2000, the disclosure of which is expressly incorporated herein by reference.

BACKGROUND

This invention relates to a method and apparatus for selecting an access technology in a multi-mode terminal. In particular, this invention relates to a method and apparatus for selecting an access technology that requires a minimal amount of power in the multi-mode terminal to achieve a maximum transmission duration capability.

Several access technologies exist today to facilitate the transmission of voice and data information over mobile radio communications systems. Examples of these technologies include: wideband code division multiple access (W-CDMA), enhanced data rates for global evolution (EDGE) classic and compact, global system for mobile communication, advanced mobile phone service (AMPS), and others. These technologies operate over different frequency bands and utilize various signaling approaches in order to transmit information over a communication network. As a result of these variations, several different access technologies may be used within a single coverage area, such as a cell, microcell, or picocell. Each of the access technologies generally utilizes a respective radiating power level. This, in turn, requires a battery of a terminal operating within the communication network to be capable of supplying a current that is proportional to the radiating power level of the technology used to access the network.

As the number of access technologies has increased, it has become desirable to design terminals to have the capability of transmitting information using more than one access technology. General aspects of such terminals are known in the art, as described by U.S. Pat. No. 5, 845,215 to Henry et al., entitled "Operating Mobile Stations of Wireless Communication Systems in Multiple Modes by External Control", the disclosure of which is expressly incorporated herein by reference.

These so-called "multi-mode" terminals allow users to choose the technology used to access the communication network depending on a number of factors. Typically, this choice involves balancing the cost of network access against the amount of services that may be available within the network for a given access technology. For example, the W-CDMA and EDGE access technologies may offer services such as voice mail or Internet access capability that are in addition to the services offered by the GSM or AMPS technologies operating within the same coverage area of the network. However, these added services may require a user to incur additional charges to access the network in comparison to access technologies that do not offer these services.

In addition to allowing users to choose a particular access technology, it is desirable to have multi-mode terminals that are capable of automatically selecting an access technology based upon a set of input parameters in order to achieve a desired functionality. One such terminal is described in U.S. Pat. No. 5,999,829 to Chun et al. ("Chun"). Chun's terminal is capable of automatically selecting between CDMA and frequency division multiple access (FDMA) access modes depending on a received electric field signal strength. As described by Chun, if the received signal strength for the CDMA mode exceeds a predetermined threshold level, the terminal accesses the communications network via the CDMA access technology. Otherwise, FDMA signaling techniques are used to access the network. Like many other conventional systems, Chun's terminal is biased towards selecting the CDMA signaling mode over the FDMA mode because of the added services available to the users of terminals that utilize the CDMA technology.

A disadvantage associated with these systems, however, is that such biasing in favor of a particular access technology (such as CDMA in the system of Chun) precludes the automatic selection of an access technology for a given terminal type that is optimal for some other function, such as maximizing the transmission duration capability of the terminal. Maximizing the transmission duration capability is often of particular importance, e.g., when sending an emergency voice message or transferring critically needed data over the communication network at a time when the energy stored in a terminal's battery is low.

As discussed above, each of the different access technologies utilizes a respective radiated power level, requiring a corresponding respective battery supply current to power the device. Access technologies utilizing higher radiated power levels require higher supply currents, while those technologies utilizing lower radiated power levels require lower supply currents. In addition, these radiated power levels may be reduced if the received electric field strength is strong enough to sustain a communication link with the network for a given type of information transfer. Also, the supply current requirements needed to sustain the different radiated power levels can vary from terminal to terminal. Moreover, certain access technologies may be capable of supporting only a particular type of information transfer (e.g., AMPS is not capable of receiving data from the Internet). If these factors could be evaluated by a terminal device, such that the access technology requiring the minimum battery supply current to sustain the desired network connection could be determined, then the transmission duration for that network connection could be maximized.

Thus, there is a need for determining, in a multi-mode terminal device, an optimal network access technology so as to maximize the transmission duration capability of the device.

SUMMARY

It is therefore an object of the invention to select an access technology that requires a minimal amount of power in a multi-mode terminal to achieve a maximum transmission duration capability. It is yet another object of the invention that the selected access technology be capable of transmitting the type of information being exchanged before the selecting has occurred.

According to the invention, these and other objects are met by a method and apparatus for selecting an access technology in a multi-mode terminal. Information is exchanged between a multi-mode terminal and a base station in a communication network using a first access technology, the multi-mode terminal being capable of exchanging information with the base station using a plurality of access technologies. The type of information exchanged is identified, and at least a second access technology is determined, different from the first access technology, that is capable of exchanging information of the identified information type. The first and the at least second access technologies form a plurality of compatible access technologies. A determination is made as to the minimum radiated power level necessary to exchange the information with the base station for each of the compatible access technologies. An optimal access technology, e.g., one requiring a lowest amount of battery energy among the compatible access technologies to maintain the minimum radiated power level, is selected to exchange the information between the multi-mode terminal and the base station.

According to an exemplary embodiment, determination of the minimum radiated power level is accomplished by measuring a received signal strength of signals received at the multi-mode terminal for each of the compatible access technologies. A minimum radiated power level is computed for each compatible access technology based on the corresponding received signal strength measurements.

According to another exemplary embodiment, selecting an optimal access technology is achieved by creating a table having table entries that include battery power levels required to operate the multi-mode terminal at a plurality of radiated power levels for each of the access technologies. A compatible access technology having the lowest battery power level for the determined minimum radiated power level is selected from the various table entries.

BRIEF DESCRIPTION OF THE DRAWINGS

The features and objects of Applicant's invention will be understood by reading this description in conjunction with the drawings, in which.

DETAILED DESCRIPTION

It should be understood that the following description, while indicating preferred embodiments of the invention, is given by way of illustration only since various changes and modifications within the scope of the invention will become apparent to those skilled in the art.

Figure 1:
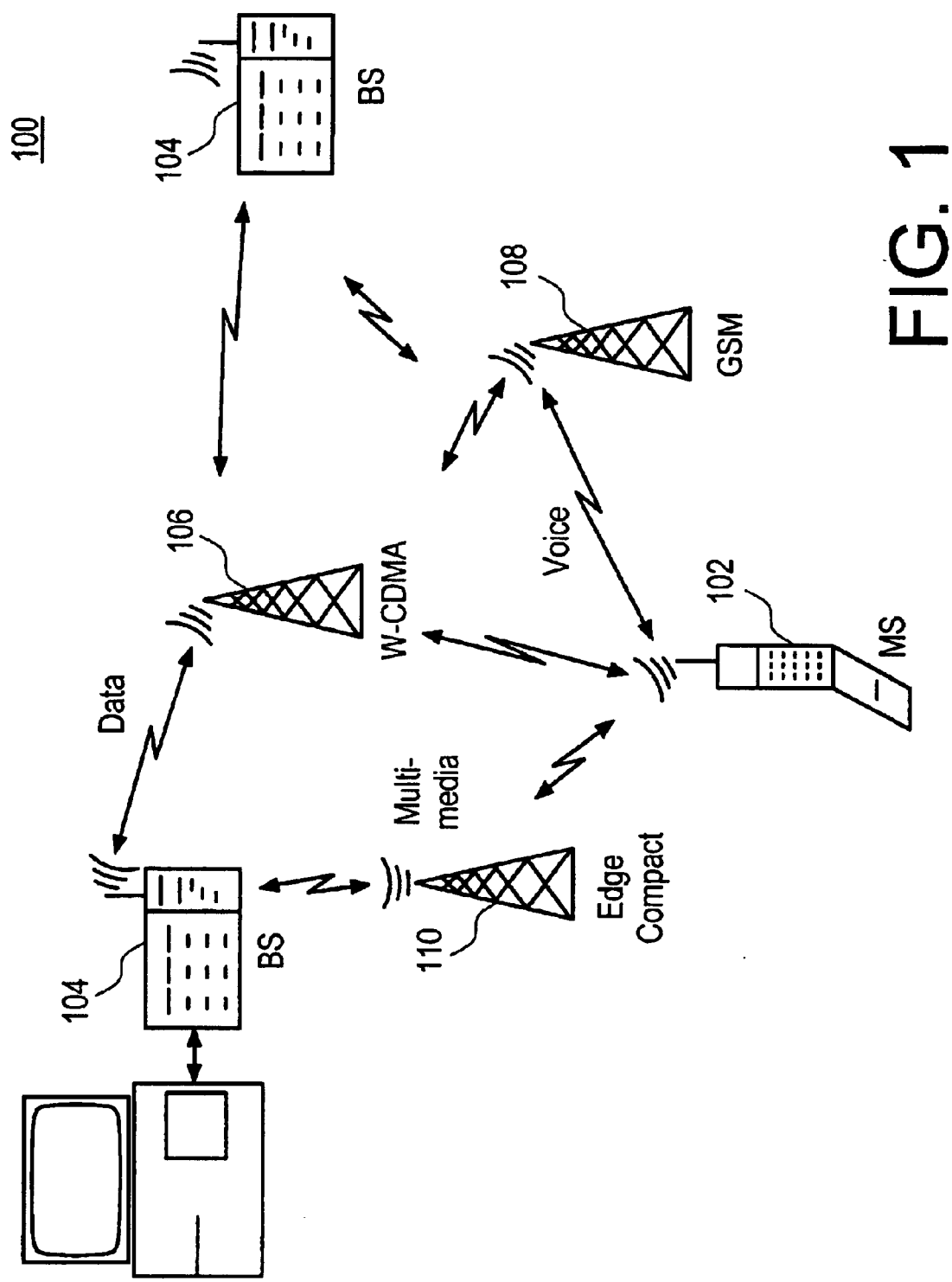
FIG. 1 illustrates a communications network in which the invention may be implemented.

According to exemplary embodiments, a method and apparatus are provided for selecting an access technology (AT) in a multi-mode terminal to achieve a maximum transmission duration capability. This may be understood by referring to FIG. 1, in which a first multi-mode terminal, e.g., a mobile station (MS) 102, is communicating with a second multi-mode terminal, e.g., one or more base stations (BS) 104, within a communicating network 100. Both the MS 102 and the BS 104 are capable of transmitting and receiving information within the network 100 using various AT links, e.g., W-CDMA 106, GSM, 108, and EDGE Compact 110. FIG. 1 depicts, e.g., MS 102 and BS 104 sharing Internet data over the W-CDMA 106 link.

It will be understood that different access technologies may be thought to define different communication networks. Thus, a plurality of BS 104 using CDMA would constitute a CDMA network, a plurality of BS 104 using GSM would constitute a GSM network, etc. Usually, a BS 104 employs only one AT, but the MS 102 may employ more than one AT. Accordingly, the MS may be said to reside in more than one communication network. These distinctions do not substantially affect implementation of Applicant's invention.

Figure 2:
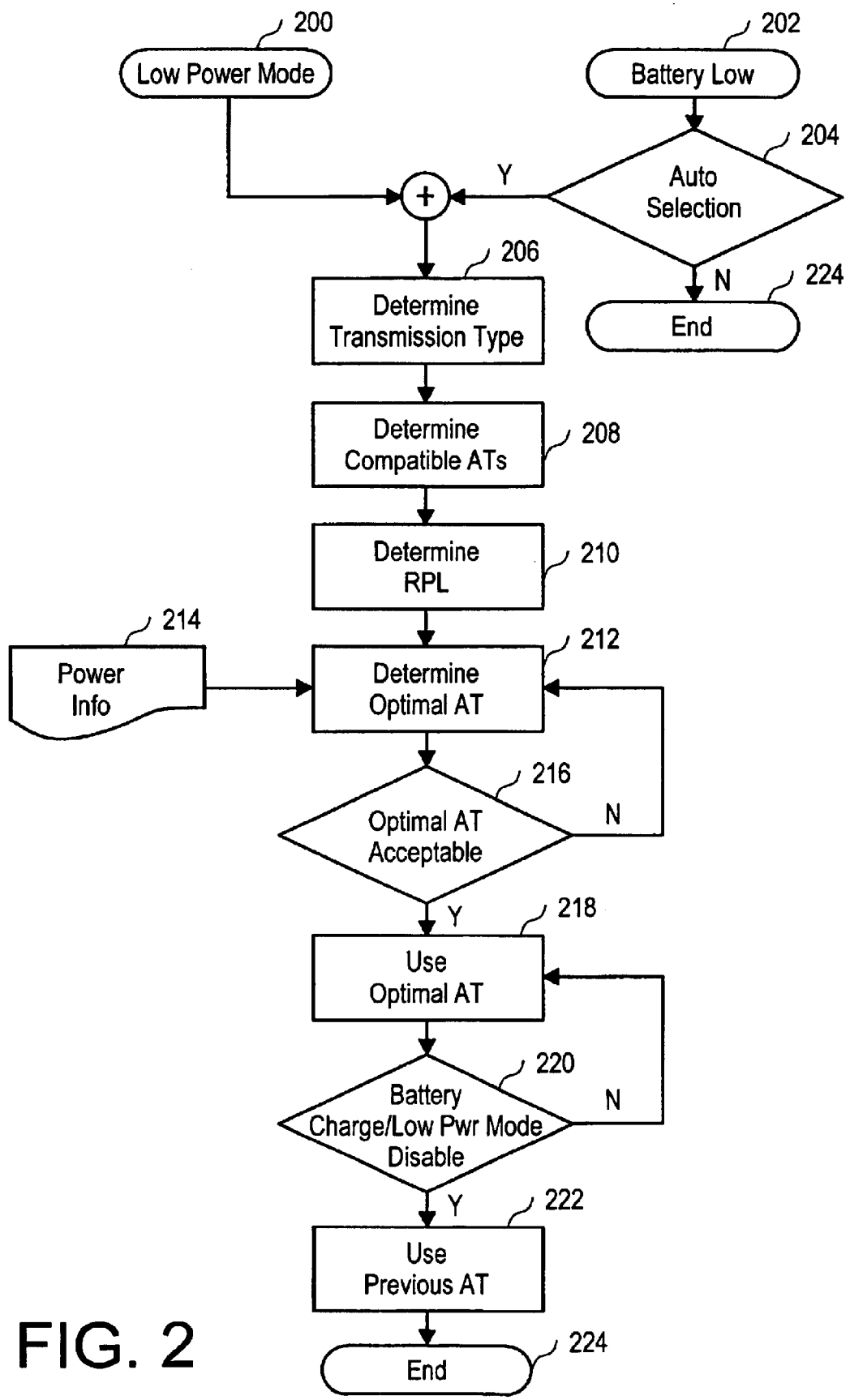
FIG. 2 illustrates a method for determining an optimal network access technology in a multi-mode terminal device according to an exemplary embodiment.

An exemplary embodiment of a method for selecting an optimal AT within are MS 102 is shown in FIG. 2. The method begins when at least one of selecting a low power mode, at step 200, and a low battery indication, at step 202, occurs at the MS 102. If a low battery condition is detected, a determination is made, at step 204, whether automatic selection of an AT is enabled in the MS 102. A user may choose to disable auto selection if, e.g., the user wants to ensure that the MS 102 will continue to use the current AT whenever a low battery condition occurs, even though the current AT may not achieve a lowest power transmission. The information necessary to determine whether to enable or disable automatic selection may, e.g., be stored in the MS 102 as a user preference. Thus, if automatic selection is disabled, the method ends at step 224, and the MS 102 continues to transmit and receive information using the current AT. If, however, automatic selection is enabled, the method continues at step 206.

At step 206, the MS 102 determines the type of information exchange taking place between the MS and BS 104 in the network 100. The various types of information exchange occurring may be, e.g., voice communication, data communication, or combination of voice and data (or multimedia) communication. Based on the information type, the MS 102 next determines, at step 208, the ATs that are available within the network 100, that are supported by the MS, and that are compatible with the type of information exchange currently taking place between the MS 102 and BS 104. For example, referring to FIGS. 1 and 2, if the MS 102 determines that Internet data is being transferred over the network in step 206, both W-CDMA (operating over the communications link 106) and EDGE Compact (operating over the communications link 110) are compatible ATs.

Next, at step 210, the MS 102 determines the minimum radiated power level (RPL) needed to sustain a reliable communications link with the BS 104. In one exemplary embodiment, the minimum RPL is determined by measuring the received signal strength (RSS) at the MS 102 of signals transmitted from the BS 104 for each of the compatible ATs identified at step 208. In another exemplary embodiment, the MS 102 uses location information, e.g., geographic position data, to estimate the path loss of each of the communications links 106, 108, 110 in the network 100, and thereby estimate the minimum RPL for each of the compatible ATs. In yet another exemplary embodiment, the MS 102 receives information from the BS 104 in order to determine the minimum RPL for each of the compatible ATs.

Having determined the minimum RPL for each of the compatible AT's, the MS 102 then determines, at step 212, an optimal AT that is the one of the set of compatible ATs that requires the MS 102 to expend the least amount of energy in order to maintain the required minimum RPL. In an exemplary embodiment, the power information 214 needed to determine the optimal AT is stored in a lookup table in a memory device in the MS 102. Table 1 illustrates the type of information that may be stored in such a table.

TABLE 1

Sample Lookup Table

| AT Type | RPL A | RPL B | RPL C | RPL D | RPL E |
|---|---|---|---|---|---|
| GSM | 1.1 | 2.2 | 3.3 | 4.4 | |
| W-CDMA | | 0.5 | 2.0 | 3.5 | 5.0 |
| EDGE Compact | 0.5 | 1.0 | 1.5 | 2.0 | |

The exemplary table lists the battery power required for the MS 102 to sustain each of five radiated power levels (RPL A through RPL E) for three AT types (GSM, W-CDMA, and EDGE Compact) that the multi-mode terminal device is capable of supporting. Thus, if GSM and EDGE Compact were to be identified as compatible ATs and the minimum RPL for both of these ATs is determined to be RPL C, the MS 102 would select EDGE Compact as the optimal AT (1.5 being less than 2.0).

When examining Table 1, those skilled in the art will appreciate that different ATs may be capable of maintaining a network connection between the MS 102 and BS 104 using different RPLs, depending on the environment (e.g., the RSS of signals transmitted using each of the compatible ATs) in which these network devices are operating. Thus, in the above example, if a network connection can be maintained using W-CDMA at the radiated power level RPL B, and using EDGE Compact at the radiated power level RPL C, the MS 102 would select W-CDMA as the optimal AT (0.5 being less than 1.5). Also, it will be appreciated that the information stored in the lookup table may vary from device to device and from manufacturer to manufacturer. The appropriate information may be stored in the multi-mode device at the time of manufacture and/or updated periodically, e.g., by messages from base stations operating within the network.

Having determined the optimal AT, the MS 102 next determines, at step 216, whether or not the selected AT is valid. A user may define a particular AT type as being invalid, e.g., for having an associated high connection fee. If the selected AT is deemed invalid, the selection process of steps 212–216 repeats until a valid optimal AT is determined or the process is otherwise terminated.

The MS 102 then switches over to the selected optimal AT at step 218, and then monitors, at step 220, whether at least one of a battery charge indication and a disabling of the low power mode occurs at the MS. During this period, the MS 102 communicates with BS 104 using the optimal AT requiring the least amount of battery supply current. Thus, the transmission duration capability is maximized for the particular type of information transfer that is occurring and the user environment in which the transmission is taking place.

If, at step 220, a battery charge indication or a disabling of the low power mode is detected, the MS 102 switches, in step 222, to the AT that the MS was using to communicate with the BS 104 when the AT optimization process began. The switching back to the pre-optimization AT in step 222 can be appropriate when there no loner exist a possibility that the battery power will expire (in the case where a battery charge indication is detected) or the user has expressly disabled the low power operation mode. If, however, the type of information being communicated over the network in low power mode is no longer supported by the AT that the MS was using to communicate with the BS 104 when the AT optimization process began, the MS 102 may continue to operate using the current AT. The method then ends at step 224.

Figure 3:
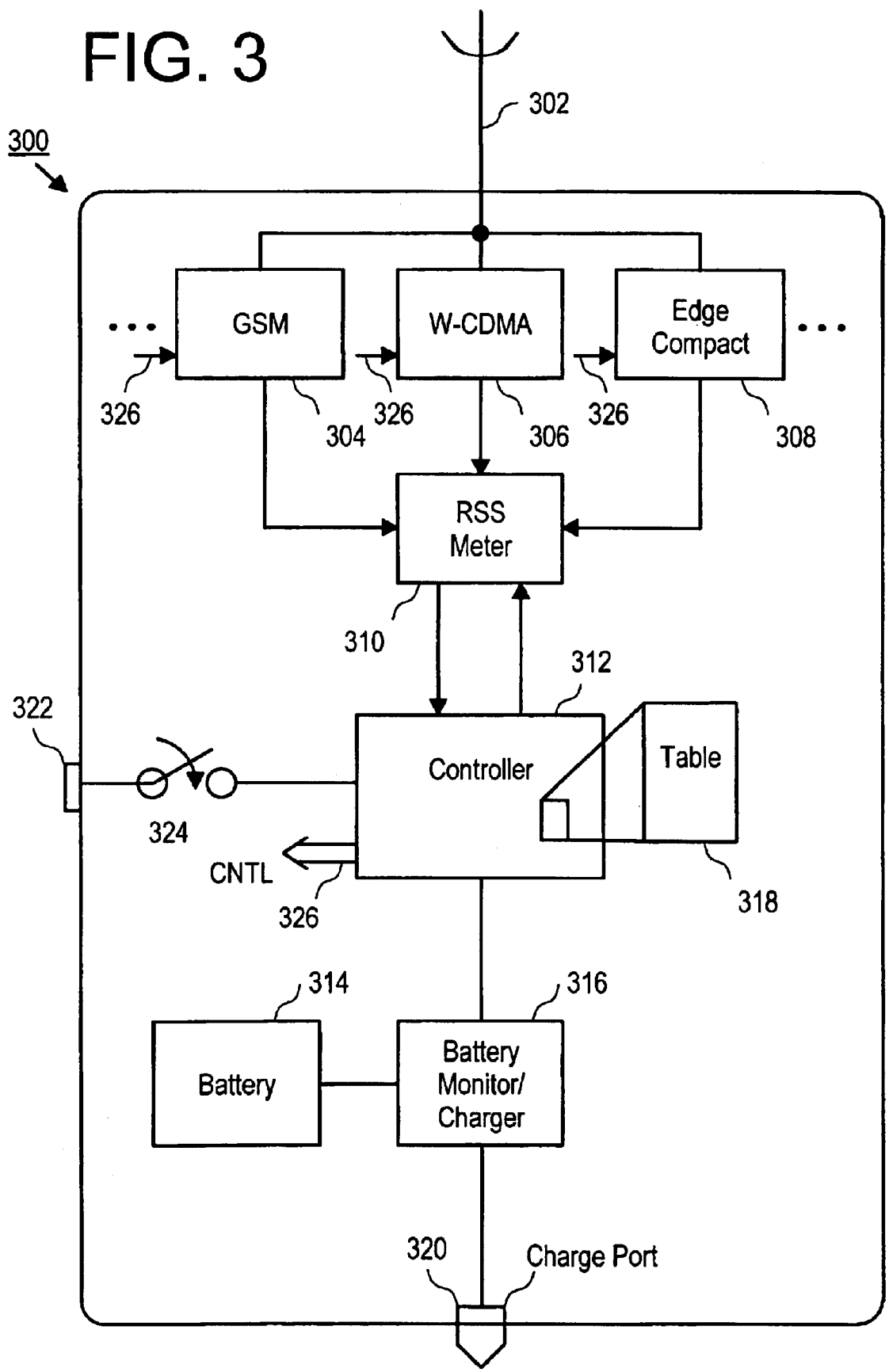
FIG. 3 illustrates a block diagram of an exemplary multi-mode terminal device in which the invention may be implemented.

An exemplary embodiment of a multi-mode terminal (MMT) device, (e.g., MS 102), in which the invention may be implemented is shown in FIG. 3. The figure depicts a MMT 300 comprising a multi-band antenna 302 that is coupled to a plurality of AT transceivers 304–308. Each of the transceivers employs a different AT type, e.g., GSM, W-CDMA, and EDGE Compact. As such, the MMT 300 is capable of transmitting information using any of these ATs that are active within the MMT's coverage area in the network. The design and operation of MMTs are known to the art, and therefore the specific details of such need not be discussed here.

As shown in FIG. 3, the MMT 300 includes a controller 312' which may be the MMT's central processor or may be a separate processor module as shown. The controller 312 may include memory for storing the lookup table 318, or the table may be stored in a separate memory module (not shown). The controller 312 receives input signals from a battery monitor/charger module 316, from a low power mode switch 324, and, according to an exemplary embodiment, from an RSS meter 310. The controller 312 processes these inputs to produce control signals 326 that control the operation of the transceivers 304–308 to select one of supported ATs as the optimal AT.

The low power mode switch 324 may be coupled to a low power mode button 322, and is used to send signals to the controller 312 to enable and disable low power operation in the MMT 300. Also, the battery monitor/charger module 316 forwards signals to the controller 312 to automatically enable and disable low power operation in the MMT. These signals are used to indicate both the amount of energy remaining in the battery 314, and whether or not the battery is being charged by an external charger (not shown) through a charging port 320. When the battery monitor/charger module 316 detects and then signals the controller 312 that the battery energy is low or when a user has manually activated low power operation by pressing the low power mode switch 322, the controller 312 then initiates a routine to select an optimal AT from a plurality of compatible AT types. The compatible AT types are those ATs that are capable of communicating with the MS 102, and in particular may be those ATs that are capable of sending and receiving the type of information (e.g., voice, data, multimedia) that is being transmitted over the network at the time low power operation is enabled in the MMT.

According to an exemplary embodiment, the controller 312 next sends signals, via the control bus 326, to the transceivers 304–308, instructing each transceiver in turn to forward signals received by the multi-band antenna 302 to the RSS meter 310. The RSS meter then measures the signal strength of each of the received signals and forwards information regarding the relative RSS of the signals to the controller 312. The controller then uses this information to determine a minimum RPL for each of the compatible ATs, sufficient to sustain the current communications link with the network.

In another exemplary embodiment, the controller 312 uses location information, e.g., geographic position data, to estimate the relative RSS of the signals received by each of the transceivers 304–308. In yet another exemplary embodiment, the controller 312 receives information from a fixed station (e.g., BS 104 of FIG. 1) in order to determine the relative RSS of the signals received by the MMT 300.

Having determined the minimum RPL for each of the compatible ATs, the controller 312 next determines an optimal AT from the set of compatible ATs that requires the MMT 300 to expend the least amount of energy in order to maintain the required minimum RPL. In an exemplary embodiment, the power information needed to determine the optimal AT is stored in a lookup table 318 that is stored in the controller memory. Table 1 above illustrates the type of information that may be stored in such a table. Once the optimal AT has been determined, the controller 312 sends signals to a corresponding transceiver 304–308 over control bus 326, instructing the transceiver to transfer desired information over the network. At the same time, the controller may command the remaining transceivers to power down.

For illustration purposes, suppose the MMT 300 is operating using the GSM AT via transceiver 304. When low power mode is entered, the controller instructs the compatible transceivers 304–308 to forward received signals to the RSS meter 310 for measurements. Suppose, for this example, that the EDGE Compact transceiver 308 is the only other compatible transceiver that can maintain the current communication link with the network. The controller 312 uses the RSS information to determine a minimum RPL for both the GSM AT and the EDGE Compact AT. Having determined the minimum RPL, the controller then determines the optimal AT using the information stored in lookup table 318.

Continuing with the illustration, suppose that controller 312 determines the EDGE Compact AT to be the optimal AT. The controller will then send the appropriate signals over the control bus 326 to change the AT from GSM to EDGE Compact. Those transceivers not being used to maintain the communications link are powered down to conserve battery energy. Low power operation continues in the MMT 300 until either the user manually disables the low power mode, or until a signal is received at the controller 312 indicating that the battery 314 is sufficiently (or is being) charged. At such time, the controller 312 sends the appropriate signals over control bus 326 to change the AT from EDGE Compact back to GSM, thus ending low power operation.

Although the invention has been described through exemplary embodiments in which the selecting of an optimal access technology is performed in the multi-mode terminal, those skilled in the art will appreciate that this selecting may take place in other places of the network. For example, a base station (e.g., BS 104) may receive periodic reports from a mobile station (e.g., MS 102) indicating a need or desire to enter a low power operating mode. The base station may then determine the optimal AT, and instruct the mobile station to hand-off to this optimal AT. Then, after determining that low power operation is no longer required, the base station can instruct the mobile station to hand-off back to the AT that was being used before the first hand-off took place.

It shall be emphasized that the terms "comprises" and "comprising" when used in this specification are taken to specify the presence of stated features, steps or components, but do not preclude the presence or addition of one or more other features, steps, components or groups thereof.

The invention being thus described, it will be obvious that the same may be varied in many ways. Such variations are not to be regarded as a departure from the essence of the invention, which is defined by the following claims, and all modifications that fall within the scope of the following claims are intended to be included therein.

What is claimed is:

1. A method comprising the steps of:
   exchanging information between a multi-mode terminal and at least one base station using a first access technology, the multi-mode terminal being capable of exchanging information with the at least one base station using a plurality of access technologies;
   identifying an information type associated with the exchanged information;
   determining at least a second access technology, different from the first access technology, capable of exchanging information of the identified information type, the first and the at least second access technologies forming a plurality of compatible access technologies;
   determining a minimum radiated power level necessary to exchange the information with the at least one base station for each of the compatible access technologies; and
   selecting one of the compatible access technologies as an optimal access technology, the optimal access technology requiring a lowest amount of battery energy amongst the compatible access technologies to maintain the minimum radiated power level.

2. The method according to claim 1, wherein the method is performed in response to at least one of an activation of a low power mode and an indication of a low battery condition in the multi-mode terminal.

3. The method according to claim 2, wherein the method is performed in response to an indication of a low battery condition only if an automatic access technology selection mode is enabled.

4. The method according claim 2, further including the step of using the first access technology to exchange the information between the multi-mode terminal and the at least one base station in response to at least one of a deactivation of the low power mode and an indication that the battery is being recharged.

5. The method according to claim 1, wherein the step of determining a minimum radiated power level comprises the steps of:
   measuring a received signal strength of signals received at the multi-mode terminal for each of the compatible access technologies; and
   computing the minimum radiated power level required for each compatible access technology to exchange the information with the at least one base station based on the corresponding received signal strength measurements.

6. The method according to claim 1, wherein the step of determining a minimum radiated power level comprises the steps of:
   receiving geographic positioning data indicating a location of the multi-mode terminal and a location of at least one communication link for each of the compatible access technologies;
   calculating a path loss between the multi-mode terminal and a nearest communication link for each of the compatible access technologies; and
   estimating the minimum radiated power level required for each compatible access technology to exchange the information with the at least one base station based on each corresponding calculated path loss.

7. The method according to claim 1, wherein the minimum radiated power level is determined based upon signal strength data sent from the at least one base station to the multi-mode terminal for each of the compatible access technologies.

8. The method according to claim 1, wherein the step of selecting an optimal access technology includes the steps of:
   creating a table having table entries that include a battery power level required to operate the multi-mode terminal at a plurality of radiated power levels for each of the plurality of access technologies; and
   selecting among the table entries a compatible access technology having a lowest battery power level for the determined minimum radiated power level.

9. The method according to claim 1, wherein the step of selecting an optimal access technology is repeated until an access technology is selected from a set of preferred access technologies.

10. A device comprising:
   a plurality of transceivers, each transceiver employing a respective access technology and being capable of operating at a plurality of radiated power levels to exchange information between the device and at least one base station;

a multi-band antenna coupled to each of the transceivers for sending and receiving signals carrying the information according to a corresponding access technology;

a battery for providing energy to a plurality of components operating within the device;

a battery monitor/charger module coupled to the battery and an external charging port for activating and deactivating a low power mode in the device;

a low power mode switch coupled to a low power mode button for activating and deactivating the low power mode;

a means for determining the signal strength of the signals received by the multi-band antenna, the means being coupled to each of the transceivers; and a controller coupled to the low power mode switch, battery monitor/charger module, means for determining signal strength, and each of the transceivers, wherein the controller, in response to an activation of the low power mode, selects a transceiver requiring a lowest amount of battery energy for exchanging the information with the at least one base station at a minimum radiated power level as determined by the strength of the signals received at the selected transceiver.

11. The device according to claim 10, wherein the means for determining signal strength comprises:

a meter for measuring the received signal strength of the signals received at each of the transceivers; and a means for determining a minimum radiated power level required for each transceiver to exchange the information with the at least one base station based on the corresponding received signal strength measurements.

12. The device according to claim 10, wherein the means for determining the signal strength comprises:

a means for receiving geographic positioning data indicating a location of the device and a location of at least one communication link capable of communicating with each of a respective one of the transceivers;

a means for calculating a path loss between the device and a nearest communication link for each transceiver; and a means for estimating the minimum radiated power level required for each transceiver to exchange the information with the at least one base station based on each corresponding calculated path loss.

13. The device according to claim 10, wherein the means for determining the signal strength comprises:

a means for receiving signal strength data sent from the at least one base station to each of the transceivers.

14. The device according to claim 10, wherein the controller includes a table having table entries that include a battery power level required to operate each of the transceivers at a plurality of radiated power levels.

15. A system comprising:

at least one base station;

a plurality of communication links each employing a respective access technology; and at least one multi-mode terminal coupled to at least one base station by the communication links, to at least one multi-mode terminal including a plurality of transceivers, each transceiver employing a respective access technology and being capable of operating at a plurality of radiated power levels to exchange information between the multi-mode terminal to at least one base station;

a multi-band antenna coupled to each of the transceivers for sending and receiving signals carrying the information according to a corresponding access technology;

a battery for providing energy to a plurality of components operating within the multi-mode terminal;

a battery monitor/charger module coupled to the battery and an external charging port for activating and deactivating a low power mode in the multi-mode terminal;

a low power mode switch coupled to a low power mode button for activating and deactivating the low power mode;

a means for determining the signal strength of the signals received by the multi-band antenna, the means being coupled to each of the transceiver; and a controller coupled to the low power mode switch, battery monitor/charger module, means for determining signal strength, and each of the transceivers, wherein the controller, in response to an activation of the low power mode, selects a transceiver requiring a lowest amount of battery energy for exchanging the information with the at least one base station at a minimum radiated power level as determined by the strength of the signals received at the selected transceiver.

16. The system according to claim 15, wherein the means for determining signal strength comprises:

a meter for measuring the received signal strength of the signals received at each of the transceivers; and a means for determining a minimum radiated power level required for each transceiver to exchange the information with the at least one base station based on the corresponding received signal strength measurements.

17. The system according to claim 15, wherein the means for determining the signal strength comprises:

a means for receiving geographic positioning data indicating a location of the multi-mode terminal and a location of at least one communication link capable of communicating with each of a respective one of the transceivers;

a means for calculating the path loss between the multi-mode terminal and a nearest communication link for each transceiver; and a means for estimating the minimum radiated power level required for each transceiver to exchange the information with the at least one base station based on each corresponding calculated path loss.

18. The system according to claim 15, wherein the means for determining the signal strength comprises:

a means for receiving signal strength data sent from the at least one base station to each of the transceivers.

19. The system according to claim 15, wherein the controller comprises a table having table entries that include a battery power level required to operate each of the transceivers at a plurality of radiated power levels.

* * * * *